(12) United States Patent
Shivji

(10) Patent No.: US 7,830,799 B2
(45) Date of Patent: Nov. 9, 2010

(54) ADJUSTING A TRANSMISSION RATE

(75) Inventor: Shane Shivji, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1179 days.

(21) Appl. No.: 10/949,000

(22) Filed: Sep. 24, 2004

(65) Prior Publication Data

US 2006/0067212 A1 Mar. 30, 2006

(51) Int. Cl.
*H04J 3/14* (2006.01)
(52) U.S. Cl. ............... 370/232; 370/236.2; 370/408
(58) Field of Classification Search ............... 370/328, 370/329, 338, 349, 395.2, 395.21, 395.53, 370/400, 401, 402, 407, 408, 445, 446, 447, 370/230.1, 231, 232, 234, 235, 236, 236.1, 370/236.2
See application file for complete search history.

(56) References Cited

U.S. PATENT DOCUMENTS

| | | | |
|---|---|---|---|
| 4,491,946 A | 1/1985 | Kryskow, Jr. et al. | |
| 4,769,810 A * | 9/1988 | Eckberg et al. | 370/232 |
| 4,769,839 A | 9/1988 | Preineder et al. | |
| 5,210,834 A | 5/1993 | Zurawski et al. | |
| 5,354,069 A | 10/1994 | Guttman et al. | |
| 5,388,231 A | 2/1995 | Starr | |
| 5,414,833 A * | 5/1995 | Hershey et al. | 726/22 |
| 5,483,676 A * | 1/1996 | Mahany et al. | 455/67.14 |
| 5,565,745 A | 10/1996 | Huether et al. | |
| 5,617,420 A | 4/1997 | Whetsel | |
| 5,721,737 A | 2/1998 | Radjabi et al. | |
| 5,761,697 A | 6/1998 | Curry et al. | |
| 5,768,543 A | 6/1998 | Hiles | |
| 6,270,415 B1 | 8/2001 | Church et al. | |
| 6,392,993 B1 * | 5/2002 | Hamilton et al. | 370/230 |
| 6,516,035 B1 | 2/2003 | Wang et al. | |
| 6,891,801 B1 * | 5/2005 | Herzog | 370/237 |
| 6,938,095 B2 * | 8/2005 | Basturk et al. | 709/238 |
| 7,301,944 B1 * | 11/2007 | Redmond | 370/390 |
| 7,376,679 B2 * | 5/2008 | Pasupathy | 707/205 |
| 2003/0139145 A1 * | 7/2003 | Lee et al. | 455/69 |
| 2004/0141526 A1 * | 7/2004 | Balasubramanian et al. | 370/503 |
| 2005/0108421 A1 * | 5/2005 | Xu et al. | 709/233 |
| 2005/0128947 A1 * | 6/2005 | Silverman | 370/232 |

* cited by examiner

*Primary Examiner*—Ricky Ngo
*Assistant Examiner*—Wei-Po Kao

(57) ABSTRACT

In one embodiment, data is received from a plurality of token devices and the rate of transmission is adjusted to match a lowest reception rate of the plurality of token devices using the data.

20 Claims, 7 Drawing Sheets

ADJUSTING A TRANSMISSION RATE

BACKGROUND

Communication protocols provide devices with an agreed-upon format that allows for transmission of data between the devices. Many communication protocols transmit and receive data at a predetermined speed or transfer rate. Furthermore, communication protocols may be limited to communications between only two devices. In other words, a particular device may not be able to communicate at a single instance to multiple devices.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Overview

The following discussion is directed to systems and methods for communication between a master and one or more token devices using a communication protocol that accommodates for the slowest token device.

Exemplary Communication System Environment

Figure 1:
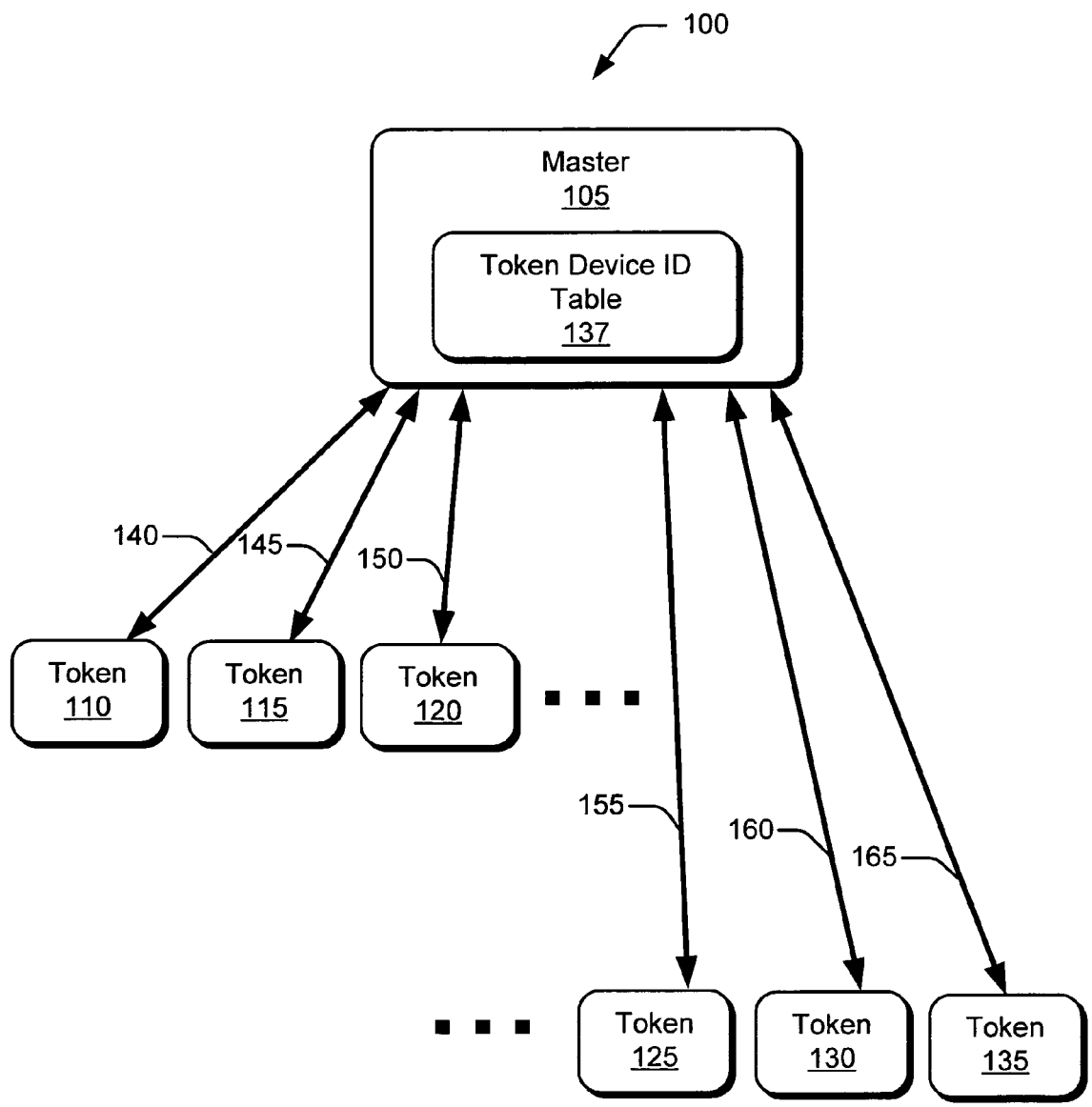
FIG. 1 is a block diagram illustrating an exemplary communication system for communication between a master device and multiple token devices, according to an embodiment of the present disclosure.

FIG. 1 shows an exemplary communication system 100. A master device 105 communicates with one or more token devices 110, 115, 120, 125, 130, and 135 using an agreed upon protocol as described below. Communication system 100 includes gaming systems, such as those employing a controlling or host device such as master device 105 and multiple game pieces such as token devices 110-135.

Master device 105 includes a token device identifier table 137 which identifies token devices 110-135 by unique identifier numbers as provided by master device to each of token devices 110-135. The identifier numbers are assigned to and provided to the token devices 110-135 using the described communication protocol below. The identifier numbers may be subsequently changed by the master device 105.

In this example, two way communication takes place between master device 105 and token devices 110-135, such that master device 105 sends (i.e., writes to) and receives (i.e., reads from) token devices 110-135. In other implementations, token devices 110-135 communicate with one another. Specifically, token device 110 communicates with master device 105 through communication path 140. Likewise token device 115 uses communication path 145; token device 120 uses communication path 150; token device 125 uses communication path 155; token device 130 uses communication path 160; and token device 135 uses communication path 165. Communication paths 140-165 may be wireless or wired. Wireless implementations of communications paths 140-165 may make use of several technologies which include infra-red (IR) and radio frequency (RF) transmission technology.

Figure 2:
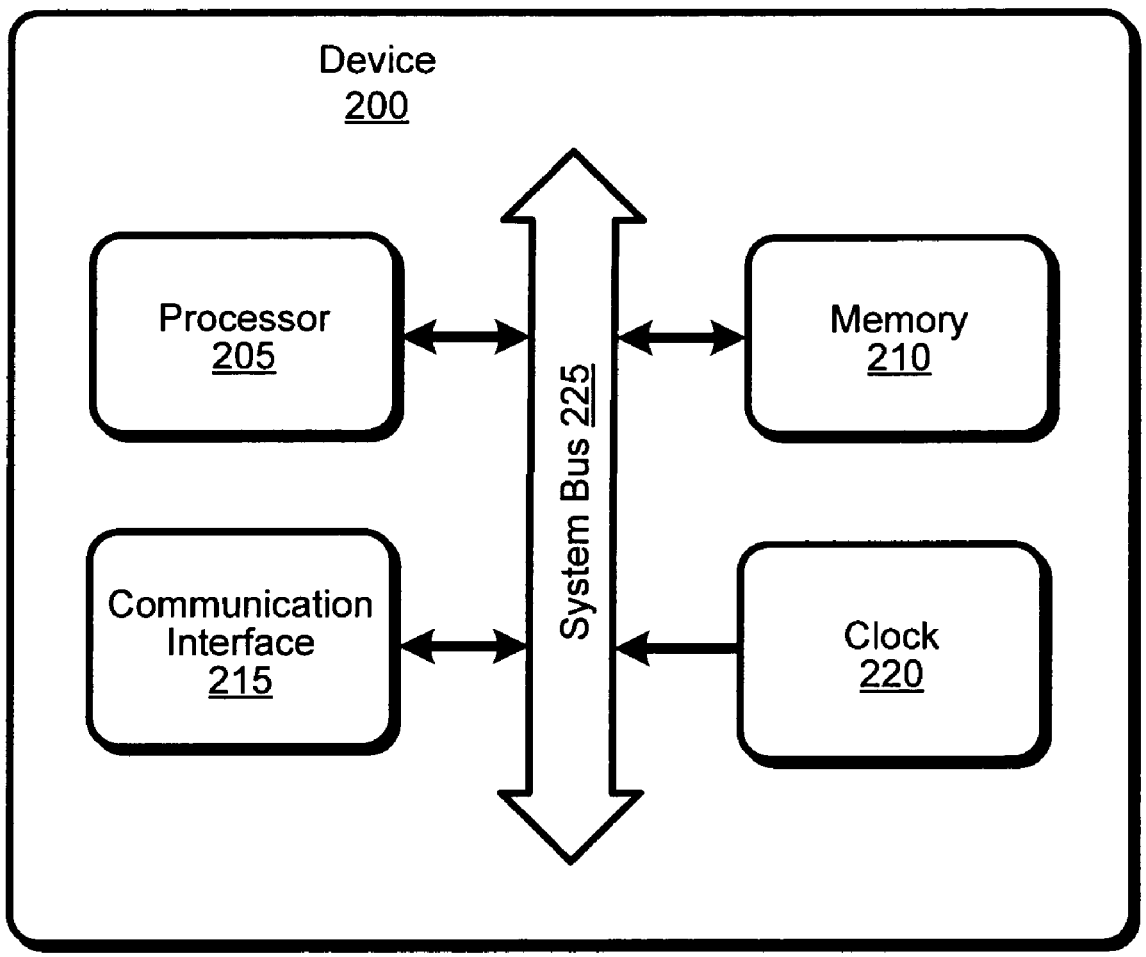
FIG. 2 is a block diagram illustrating an exemplary device that uses an embodiment of a protocol, according to an embodiment of the present disclosure.

FIG. 2 shows an exemplary device 200 that uses the communication protocol described below. Device 200 may be representative of master device 105 and particular implementations of token devices 110-135.

Device 200 includes a processor 205 to process various instructions to control operation of device 200, including processing of instructions stored in a memory 210. Furthermore, processor 205 is used to communicate with other devices, and particularly communicate using the communication protocol described below. In other embodiments, an application specific integrate circuit (ASIC) may be implemented which may or may not include a processor.

Memory 210 stores instructions or data structures that implement the communication protocol described below and may store other instructions and applications. Memory 210 further may store identifier numbers of token device which may be in the form of a database or table such as table 137 of FIG. 1. Memory 210 is a computer readable medium, which may include one or more memory components, examples of which include a random access memory (RAM), and non-volatile memory (e.g., any one or more of a read-only memory (ROM), flash memory, EPROM, EEPROM, etc.).

Device 200 further includes a communication interface 215 used to pass and receive communications or data between device 200 and other devices. For wireless RF communications, communication interface 215 may include an antenna, an analog to digital (AD) converter, and a digital to analog (DA) converter. For wireless IR communications, communication interface 215 may include an IR sensor and receiver, an AD converter, and a DA converter. For wired communications, communication interface 215 may make use of one or more of several communication standards such as universal serial bus, parallel port, and other industry and/or proprietary wired interface standards.

A clock 220 is included that provides a clock signal having a particular frequency or rate at which bits (digital words)

processed using the described communication protocol are transmitted from device 200. Clock 220 may be a general purpose clock that provides timing for device 200.

In particular implementations, a token device may not have a clock signal which determines when a bit is transmitted, and clock 220 is therefore not included in such a token device. In these implementations, the token device waits for a bit to be received from the master prior to sending its bit—such as in a full-duplex transmission. The bit transmission may be event driven by the master. Each bit signal transition from the master triggers a bit from the token device to be sent.

In this example, a systems bus 225 connects processor 205, memory 210 and communication interface 215, clock 220, and other components (not shown) that are included in device 200. Systems bus 225 receives and sends communication (i.e., data, commands, and instructions) from processor 205, memory 210, and communication interface 215. Systems bus 225 receives the clock signal from clock 220.

Figure 3:
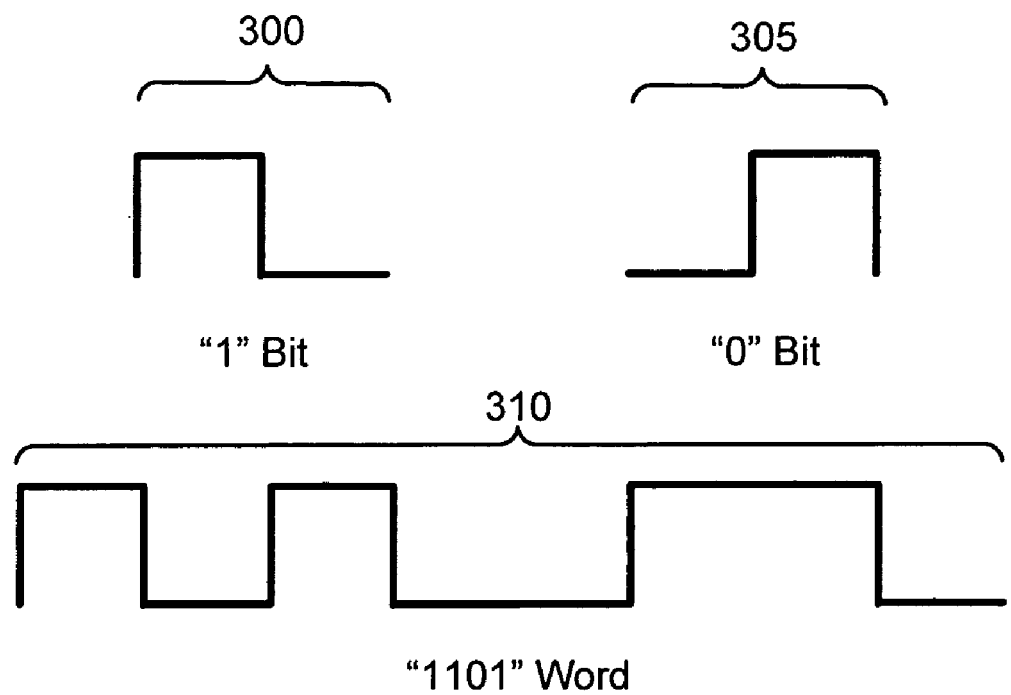
FIG. 3 is a block diagram illustrating bi-phase coded bit representation employed by an embodiment of a protocol, according to an embodiment of the present disclosure.

FIG. 3 shows a bi-phase coded bit representation employed by the herein described communication protocol. Certain implementations of the communication protocol may make use of bi-phase coded bits to allow for asynchronous bit communications. Bi-phase coded bits provide for a transition for each data bit and is intended to reduce timing errors. Manchester encoding is an example of bi-phase coded bits. In embodiments of the herein described communication protocol, bi-phase coded bit representation is used in communicating data; however, as will be discussed below, it may not be used for particular transmissions such as initiating sequences, speed sequence, acknowledgments, and stops.

In this example, a bit representing "1" is seen as bit 300. Bit 300 starts with a high logic value followed (transitioned) to a low logic value. A bit representing a "0" starts with a low logic value followed (transitioned) to a high logic value. Word 310 is an example of a bit word that uses the described bi-phase encoding, and represents the digital word "1101".

Figure 4:
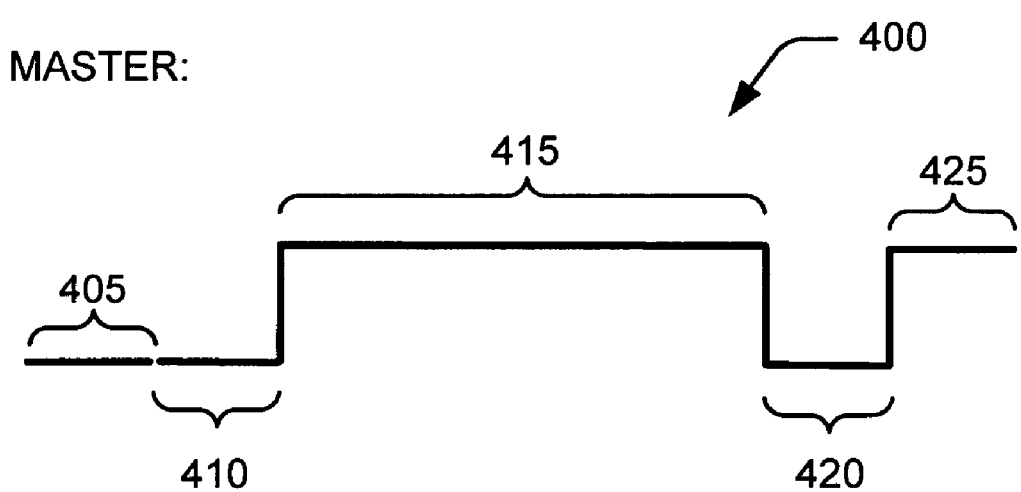
FIG. 4 is a block diagram illustrating an initial start speed sequence bit transmission from a master device, according to an embodiment of the present disclosure.

FIG. 4 shows an initial start and speed sequence bit transmission 400 from a master device, according to an embodiment of the present disclosure.

A master device, such as master device 105, initiates a start sequence by transmitting a unique data or bit pattern. The bit pattern may not be bi-phase coded. In other words a logic value of "0" such as bits 405 and 410 is simply a low value. In this example, bit 405 is a previous stop bit followed by start bit 410.

In one embodiment, the unique bit pattern that is recognized by a receiving token device is sent as a series of four high logic values (e.g., four "1" bits) as represented by bits 415, followed by a low logic value (e.g., one "0" bit) as represented by bit 420. A subsequent high logic value 425 that follows bit 420 indicates the start of data transmission from the master device.

In one embodiment, a valid start is determined when a ratio of two low logic values and five high logic values are received by a token device. In other words, if a token device determines that there are more than two low logic values for every five high logic values, it is not a valid start. The use of bi-phase encoding is particularly not used, since bi-phase encoding may have up to two cycles at the same logic level. Therefore bi-phase encoding is not used in order to allow token devices to distinguish a start.

In one embodiment, the master device initially transmits the bits at the lowest possible rate that a potential token device may receive. As discussed below, the transfer rate may be increased after the master device receives a similar speed sequence bit pattern from the token device.

In one embodiment, the speed sequence or rate is determined by the token device by accounting for the time in receiving the four high cycles and one low cycle (or a total of five cycles). In other words, the rate or speed is five cycles divided by the time in which four high bits and one low bit are received. The logic value is the initial speed sequence.

Figure 5:
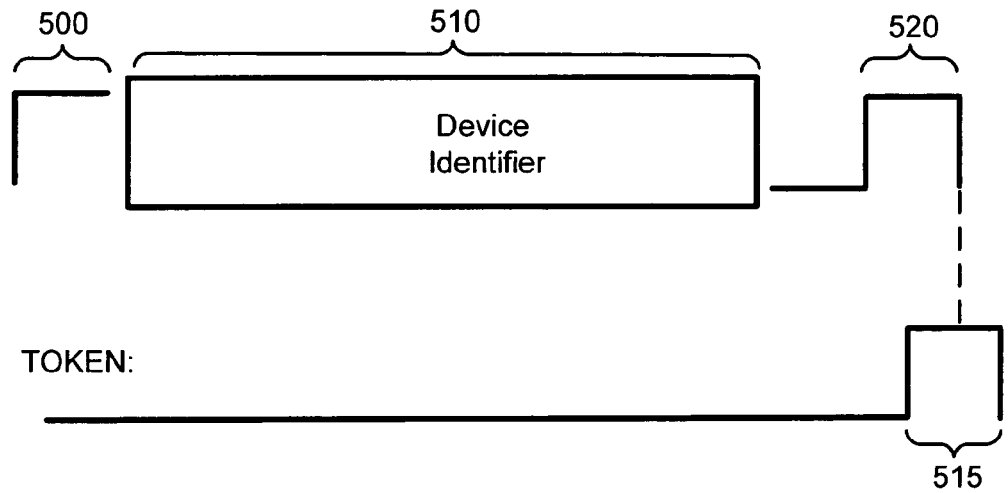
FIG. 5 is a block diagram illustrating a start identifier that indicates a device identifier bit transmission from a master device and acknowledge bit transmission from a token device, according to an embodiment of the present disclosure.

FIG. 5 shows a start identifier that indicates a device identifier bit transmission from a master device, and an acknowledge bit transmission from a client device according to one embodiment.

In embodiments where a token device does not have an identifier number that is recognized by the master device, the token device may be identified as a zero ("0"). The master device when looking for new token devices may broadcast device identifier of zero ("0") in order for new devices to respond back to the master device. Token devices initially have an identifier of "0", and if not addressed for a time by the master device, regardless of the identifier they have, go back (change) to identifier "0".

A high bit 500 (which may be bit 425 of FIG. 4) indicates the beginning of a start identifier. Bits 510 indicate a unique device identifier that is assigned to a particular token device and is referenced in token device ID table 137 by master device 105 of FIG. 1. As an example, bits 510 may be made up of eight bits or a byte-word with a most significant bit (MSB) and least significant bit (LSB), where the MSB is transmitted first. The number of unique device identifiers is 256 for an byte-word identifier; however, all numbers may not be used. The two MSB may be used to as a family or group identifier that groups particular token devices together. The family identifier bits allow communication to take place between the master device and a particular family or group of token devices. For example, when the master device desires to broadcast to a particular family, the family identifier is identified in the appropriate bits of bits 510, and the remaining bits are set to don't care (DC) logic values.

The end of the start identifier transmission may be left at a high or low state; however, after the last cycle, the transmission transitions to a low state. A stop sequence or stop transmission may be indicated by four consecutive low state cycles. In this embodiment, bi-phase coding may not be used for the stop sequence.

The receiving token device responds back to the master device by sending an acknowledge bit 515. The acknowledge bit 515 is sent for at least one cycle in order for the master device to recognize the acknowledge bit 515. The master device responds to acknowledge bit 515 with an acknowledge check bit 520—the acknowledge bit 515 being sampled on the falling edge of the acknowledge check bit 520 by the master device. In certain cases, the acknowledge bit 515 may be a speed sequence bit transmission that is described below. As further described below, the speed sequence bit transmission from the token device allows the master device to readjust its bit rate transmission to increase the bit rate transmission of the token device.

If transmission is to be stopped, a stop sequence or four logic low values may be transmitted instead of an acknowledge bit 515.

Figure 6:
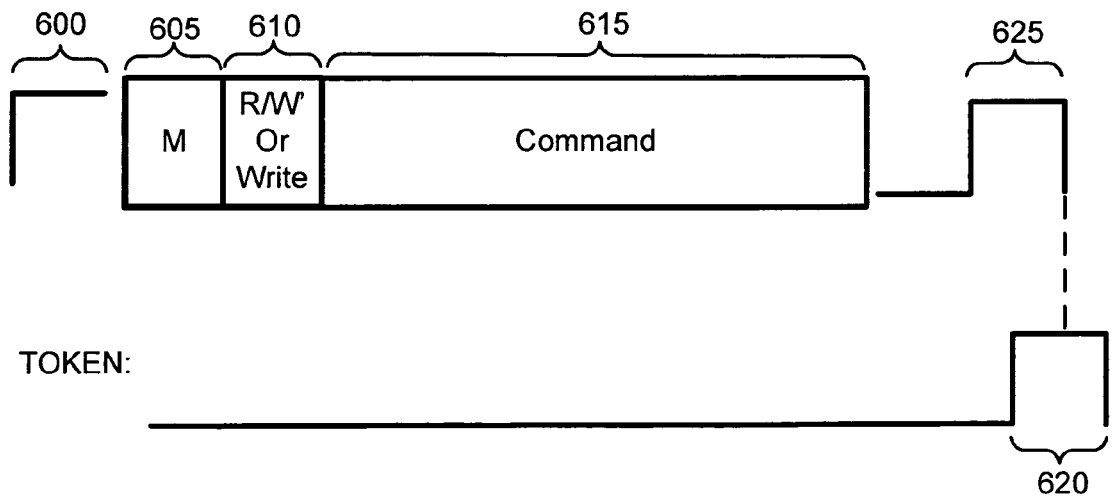
FIG. 6 is a block diagram illustrating a command sequence bit transmission from a master device and an acknowledge bit transmission from a token device, according to an embodiment of the present disclosure.

FIG. 6 shows a command sequence bit transmission from a master device and an acknowledge bit transmission from a token device according to one embodiment. The command sequence bit transmission follows receipt of an acknowledge bit (e.g., acknowledge bit 515) by the master device from the token device. A high bit 600 precedes and indicates the start of the command sequence bit transmission.

In this example, the command sequence transmission is an eight bit word or a byte word. The MSB is bit 605 which is transmitted first. If a logic value of "1" is provided at bit 605, it indicates a standard command that is reserved and is recognized by all token devices. If the logic value at bit 605 is "0" it is a command that may be created by a user or unique to specific token devices.

Bit 610 defines whether a write or a read is to be performed. A logic value of "0" indicates a read or a transmission of data from master device to token device(s). A logic value of "1" indicates a write or a reception of data from token device(s) to the master device.

A 6-bit command word 615 follows bit 610, where command word 615 represents various commands or instructions. Examples of instructions include "Do Nothing", "Send Device ID", "Send Vendor ID", "Set Family ID", etc.

In certain situations, a data bit sequence transmission as described below is performed by the master device that broadcasts a time-stamp to token devices. This time-stamp broadcast may be sent to all eligible token devices. Token devices having an out of date time stamp may be reset in order for the master device to identify them. In other words, the scenario is the master device sends out a general broadcast—no particular device or family is identified (i.e., identifier bits set to DC), and the token devices (i.e., token devices with out of date time-stamps) are requested to send back their identifier numbers to the master devices. In other words, the master device sends a command using the command sequence bit stream, instructing token devices that are identified as having out of date time-stamps. The command is sent to specific token devices, or groups of token devices. If a token device determines that the identifier byte is not for them, it does not have to listen anymore. For example, with less than 16 transmissions, 16 token devices in a group can be group addressed and have their time stamp updated. Then with less than 16 transmissions all token devices can have their time stamp checked. If the time stamp doesn't match, a token device will set its device id to "0" and be re-instantiated by the master device.

The receiving token device responds back to the master device by sending an acknowledge bit 620. The acknowledge bit 620 is sent for at least one cycle in order for the master device to recognize the acknowledge bit 620. The master device responds to acknowledge bit 620 with an acknowledge check bit 625—the acknowledge bit 620 being sampled on the falling edge of the acknowledge check bit 625 by the master device.

If transmission is to be stopped, a stop sequence or four logic low values may be transmitted instead of an acknowledge bit 620.

Figure 7:
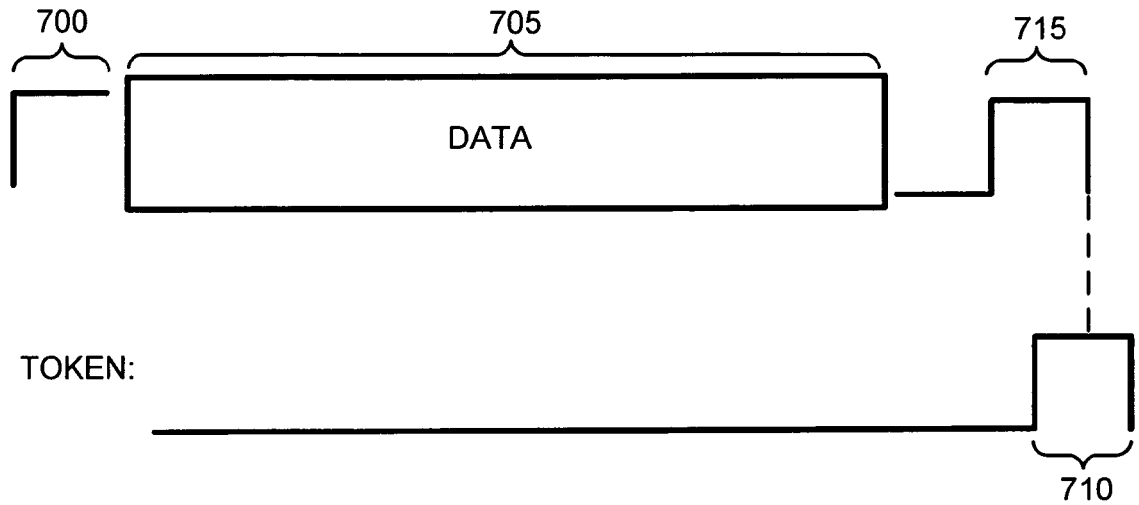
FIG. 7 is a block diagram illustrating a data sequence bit transmission from a master device and an acknowledge bit transmission from a token device, according to an embodiment of the present disclosure.

FIG. 7 shows a data sequence bit transmission from a master device and an acknowledge bit transmission from a token device according to one embodiment. The data sequence bit transmission follows receipt of an acknowledge bit (e.g., acknowledge bit 620) by the master device from the token device. A high bit 700 precedes and indicates the start of the data sequence bit transmission.

In this embodiment, data word 705 may be an eight bit word or byte word which token devices should be able to receive and transmit in order for clients to respond to commands and start sequence transmissions from the master device. Data word 705 may be set to accommodate greater word lengths (e.g. such as 16, 32, and 64 bit words) depending on capability of master and token devices. The MSB of data word 705 is transmitted first.

In order to verify that the token device has received the data, the token device responds back to the master device by sending an acknowledge bit 710. The acknowledge bit 710 is sent for at least one cycle in order for the master device to recognize the acknowledge bit 710. The master device responds to acknowledge bit 710 with an acknowledge check bit 715—the acknowledge bit 710 being sampled on the falling edge of the acknowledge check bit 715 by the master device.

If transmission is to be stopped, a stop sequence or four logic low values may be transmitted instead of acknowledge bit 710.

Figure 8:
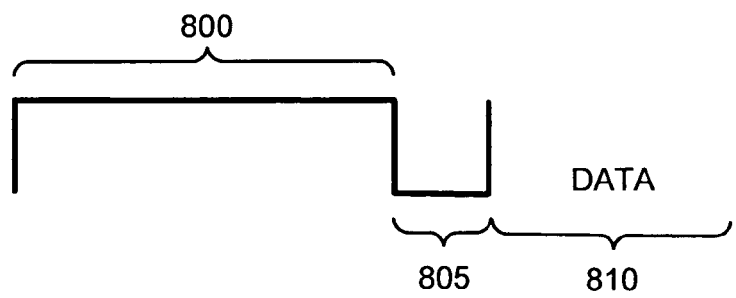
FIG. 8 is a block diagram illustrating a start or speed sequence bit transmission from a token device, according to an embodiment of the present disclosure.

FIG. 8 is a block diagram illustrating a speed sequence bit transmission from a client device, according to an embodiment of the present disclosure. The speed sequence bit transmission may be transmitted from a token device prior to sending data to the master device. The speed sequence bit transmission is particularly used when a token device has a clock (e.g., clock 220 of FIG. 2) which determines a transfer rate for bit transmission. For implementations of a token device where there is no clock, the speed sequence bit transmission may not be used.

The speed sequence bit transmission is similar to the speed sequence bit transmission transcribed above that a master device transmits to a token device, and likewise may not be bi-phase coded.

In one embodiment, the speed sequence bit transmission includes a unique bit pattern of four high logic values (e.g., four "1" bits) (e.g., four "1" bits) as represented by bits 800, followed by a low logic value (e.g., one "0" bit) as represented by bit 805. The speed sequence bit transmission may be used by the master device to determine the bit rate at which the token device is transmitting. Knowing the actual bit rate at which the token device is transmitting allows the master device to adjust, such as increase, its bit rate transmission if applicable.

In one embodiment, the speed sequence or rate is determined by the master device by accounting for the time in receiving the four high cycles and one low cycle (or a total of five cycles). In other words, the rate or speed is five cycles divided by the time in which four high bits and one low bit are received. The master device may then adjust for the actual calculated speed sequence.

The token device data sequence bit transmission is particularly sent when a command bit sequence transmission is sent by the master device which indicates a read. In reference to FIG. 6, bit 610 indicates a read when a logic "1" value is provided. The subsequent command word 615 indicates to the token device to send a data sequence bit transmission.

The master device responds back to the token device with an acknowledge bit and the token device responds with an acknowledge check bit. If the master device desires to stop transmission the master device sends a stop sequence of four logic low values instead of an acknowledge bit. If the token device desires to stop transmission the token devices sends a stop sequence of four logic low values instead of any subsequent data sequence bit transmission.

Figure 9:
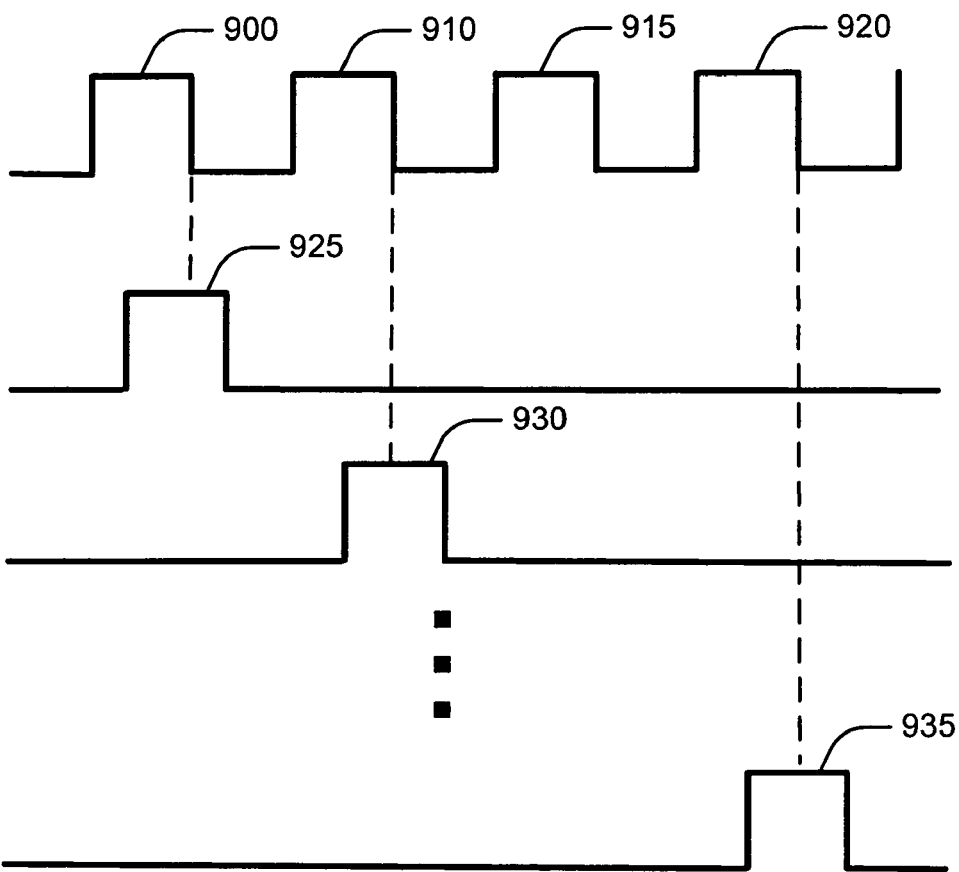
FIG. 9 is a block diagram illustrating an acknowledge sequence bit transmission between a master device and multiple token devices, according to an embodiment of the present disclosure.

FIG. 9 is a block diagram illustrating an acknowledge sequence bit transmission between a master device and multiple client devices according to one embodiment. When multiple token devices, such as multiple token devices in a particular group or family, are communicated with by a master device, each token device is provided a time slot to perform an acknowledge sequence between the master token and each of the token devices. In addition to the time slot, the each token device is given an acknowledge event that tells it when to reply.

This example shows an acknowledge sequence for a multiple write (i.e., master sends data) transmission. Acknowledge check bits 900, 905, 915, and 920 are transmitted by the master device in response to acknowledge bits that are transmitted by multiple token devices. In this example a token device "0" transmits an acknowledge bit 925; a token device "1" transmits an acknowledge bit 930; and a token device "N" transmits an acknowledge bit 925.

Acknowledge check bits 900-920 are given a time slot to respond to their respective acknowledge bits, where acknowledge bits 925-935 are given a time slot to be transmitted by their respective token devices. The acknowledge bits 925-935 are checked on the falling edge of their respective acknowledge check bits 900-920. Alternatively, acknowledge may be driven by events—the master device asserts an acknowledge check, waits for a token device to send an acknowledge bit, pulls its line to a low logic state, waits one cycle, pulls its line to a high logic state for a succeeding acknowledge bit. Acknowledge based on events is not viable, if a token at an address which the master device is communicating to, does not exist.

When the multiple acknowledge sequence is complete, the master may transmit at a single instance a command bit sequence or a data bit sequence to all token devices that have successfully completed the acknowledge sequence.

In one embodiment, when performing a multiple read (i.e., master receives data), each token device is allowed to send its data prior to the master device, prior to subsequent token devices sending their data to the master device. Acknowledgement sequence is performed as described above when a single token device communicates with the master device.

Figure 10:
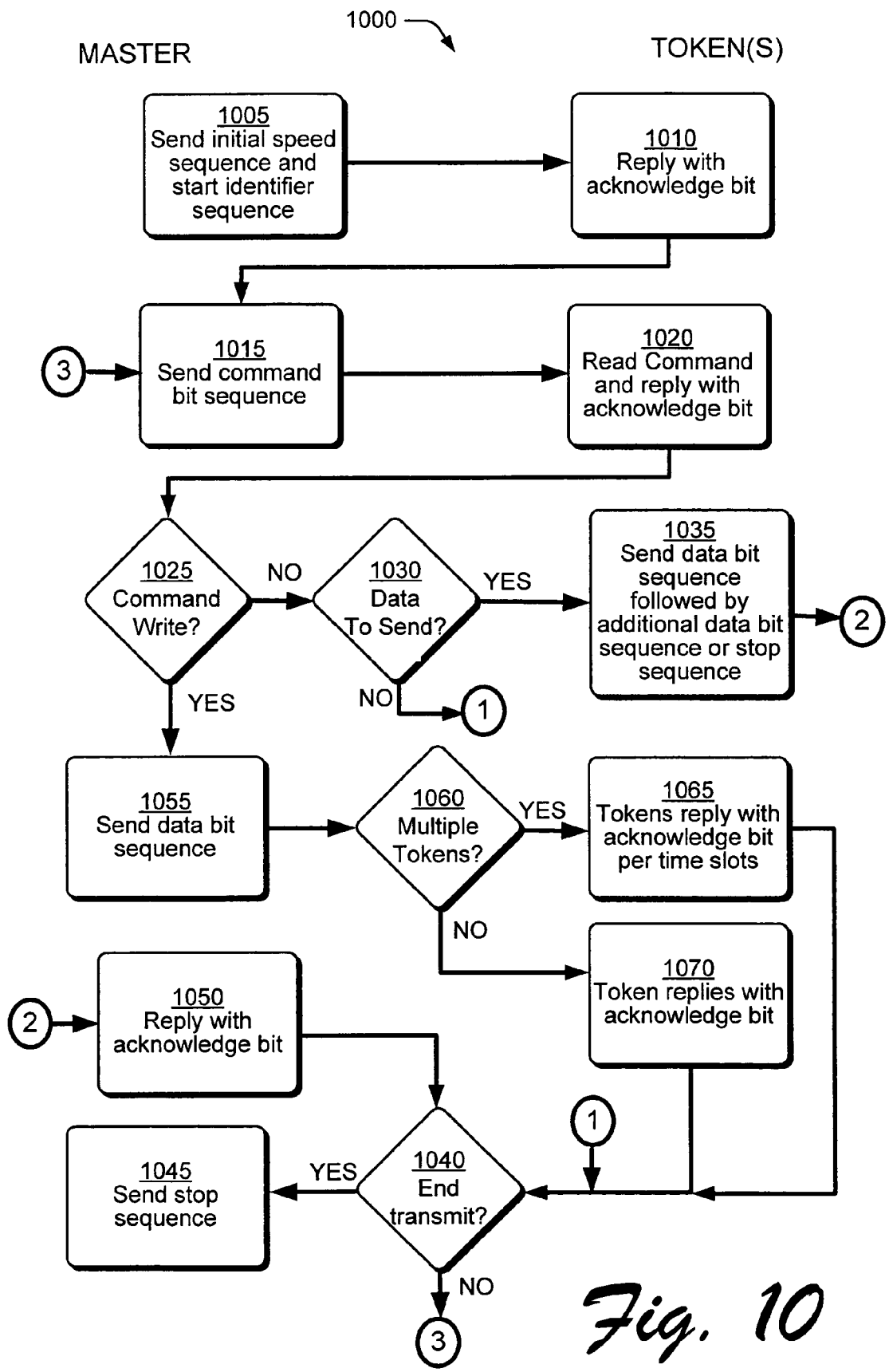
FIG. 10 is a flow chart illustrating initiating and conducting communication between a master and one or more token devices, according to an embodiment of the present disclosure.

FIG. 10 shows an embodiment of a process, such as process 1000, to initiate and conduct communication between a master and one or more token devices. The process takes place whenever a master device begins (i.e., looks for) communication with one or more token devices and during communication of data between the master device and the token devices.

The process 1000 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations. The process 1000 is described with reference to master device 105 and token devices 110-135 of FIG. 1, where master device 105 provides for means to perform particular processes and one or more of tokens 110-135 provide means to perform particular processes.

At block 1005, master device 105 transmits (initiates) an initial speed sequence bit pattern that includes four high logic values, followed by one low logic value. A start identifier sequence identifying a particular token device or devices is transmitted after the speed sequence. Initially, when token devices have not been identified by the master device 105, a general broadcast is transmitted which all token devices are able to receive. Unidentified token devices may be given an identification number of zero ("0") and later through a command and data bit sequence from the master device 105 be given a unique identifier number.

At block 1010, one or more token devices 110-135 transmit an acknowledge bit upon receipt of the speed sequence and start identifier bit sequence from master device 105. Master device 105 performs an acknowledge check by transmitting an acknowledge check bit.

At block 1015, the master device 105 sends a command bit sequence to be read by token devices 110-135 as identified by the start identifier sequence at block 1005. Command bit sequences may include a start, an identifier, and command data. Write commands may or may not contain data packets. When initiating or when token devices do not have a particular identifier number the command bit sequence may be to receive a particular identifier number which the master device tracks (e.g., keeps in a reference table such as table 137 of FIG. 1). Token devices have an identifier number, where unassigned token devices have an identifier number of "0".

At block 1020, the identified token device or devices 110-135 reads the transmitted command and replies with an acknowledge bit that the command was received. Master device 105 performs an acknowledge check by transmitting an acknowledge check bit.

Commands from the master device 105 may be write (i.e., send data) or read (i.e., receive data). For read commands (i.e., following the "NO" branch of block 1025) there may or may not be data to be sent from the token device. If data is to be sent (i.e., following the "YES" branch of block 1030), the command instructs the identified token device or devices to send data or perform block 1035. Block 1035 further provides that after the data bit sequence, that the token device or devices 110-135 send either a succeeding data bit sequence or a stop sequence (e.g. four logic low values).

If no data is to be sent (i.e., following the "NO" branch of block 1030), transmission may end. If transmission is to be stopped (i.e., following the "YES" branch of block 1040), at block 1045, the master device performs a stop sequence by transmitting four logic low values. If transmission is to continue (i.e., following the "NO" branch of block 1040), a subsequent command bit sequence is sent from the master device (i.e., block 1015 is performed).

At block 1055, the master device 105 replies with a acknowledge bit indicating it has received the data bit sequence from the token device or devices 110-135. The token device or devices 110-135 may perform an acknowledge check by transmitting an acknowledge check bit. Transmission may or may not end afterwards (i.e., block 1040).

If a command is a write (i.e., following the "YES" branch of block 1025), the master device sends a data bit sequence to the token device or devices 105-135 or performs block 1055.

One or more than one (multiple) of token devices 105-135 may receive the data bit sequence from the master device. If multiple token devices receive the data bit sequence (i.e., following the "YES" branch of block 1060), at block 1065, each of the multiple token devices replies with an acknowledge bit per an allocated time slot, until all token devices have had an opportunity to reply. The master device may perform an acknowledge check by transmitting acknowledge check bits per each acknowledge bit transmitted by the token devices. The master device then determines if transmission is to be stopped or continued (i.e., block 1040).

If a single token device receives the data bit sequence (i.e., following the "NO" branch of block 1025), at block 1070, the token device replies with an acknowledge bit. The master device may perform an acknowledge check by transmitting acknowledge check bit. The master device then determines if transmission is to be stopped or continued (i.e., block 1040).

This described protocol may also be a physical layer of a more complicated protocol. Transmitted data may be encrypted, include a parity or checksum byte added, or encoded in another method that is unique to a token device. The physical layer provides all the basic functionality for communications without using a large protocol stack for communications with simpler devices.

Although embodiments have been described in language specific to structural features and/or methodological acts, it is to be understood that the subject matter of the appended claims is not necessarily limited to the specific features or acts described. Rather, the specific features and acts are disclosed as exemplary forms of implementing the claimed subject matter.

The invention claimed is:

1. A method, comprising: sending initial data from a master device to a plurality of token devices at an initial transmission rate, wherein the initial transmission rate comprises a lowest possible rate at which a potential token device may receive initial data; in response, receiving data at the master device from the plurality of token devices; using the received data to determine a rate at which each of the plurality of token devices are transmitting; and increasing the transmission rate of the master device to match a lowest of the transmission rates of the plurality of token devices; wherein receiving the data at the master device from the plurality of token devices includes receiving a speed sequence transmission from each of the plurality of token devices, the speed sequence transmission including a number of cycles, and wherein using the received data to determine the rate at which each of the plurality of token devices are transmitting includes dividing the number of cycles by a time taken to receive the number of cycles.

2. A method of communication, comprising: initialing a speed sequence and start identifier sequence from a master device; receiving an acknowledge at the master device from a token device that the speed sequence and start identifier sequence were received, the acknowledge including a speed sequence from the token device to the master device; using the speed sequence for the token device to determine a rate at which the token device is transmitting; adjusting a transmission rate of the master device based on the rate at which the token device is transmitting; and transmitting a command sequence from the master device when the acknowledge from the token device has been received, wherein the master device communicates with a plurality of token devices, and wherein each token device is assigned a respective time slot to perform the acknowledge with the master device; wherein the speed sequence form the token device includes a number of cycles, and wherein using the speed sequence from the token device to determine the rate at which the token device is transmitting includes dividing the number of cycles by a time taken to receive the number of cycles.

3. The method of claim 2 wherein the speed sequence from the master device is a series of four high logic values followed by one low logic value.

4. The method of claim 2 wherein the speed sequence from the master device is used by the token device to derive a master device cycle time.

5. The method of claim 2 wherein the start identifier sequence from the master device is a bi-phase coded word comprising a device identifier number.

6. The method of claim 2 wherein the start identifier sequence from the master device identifies all available token devices and is used to initiate communication between the master device and the token device.

7. The method of claim 6 wherein the command sequence from the master device provides that a unique identifier number be sent to the token device, and further comprising sending a data sequence from the master device to the token device that provides the token device with the unique identifier number that is tracked by the master device.

8. The method of claim 2 wherein the acknowledge from the token device is an acknowledge bit transmitted from the token device, and wherein the master device performs an acknowledge check on the acknowledge bit.

9. The method of claim 2 wherein the command sequence from the master device is identified as a command that writes to or reads from the token device.

10. The method of claim 2 further comprising sending a data sequence to the token device from the master device.

11. The method of claim 2 further comprising sending a data sequence to the master device from the token device.

12. The method of claim 11 wherein the sending a data sequence to the master device from the token device is preceded by transmitting the speed sequence from the token device to the master device.

13. The method of claim 2 wherein adjusting the transmission rate of the master device includes increasing the transmission rate of the master device to the rate at which the token device is transmitting.

14. The method of claim 2 further comprising tracking at the master device a unique identifier number assigned to the token device.

15. The method of claim 2 wherein each token device is provided an acknowledge event that identifies a time to reply.

16. The method of claim 2 wherein the communication is performed using wireless or wired technology.

17. The method of claim 2 implemented by a gaming system.

18. A computer-readable medium encoded with computer-executable instructions when executed causing a computer to perform steps comprising: sending initial data from a master device to a plurality of token devices at an initial transmission rate, wherein the initial transmission rate comprises a lowest possible rate at which at potential token device may receive initial data; in response, receiving data at the master device from the plurality of token devices; using the received data to determine a rate at which each of the plurality of token devices are transmitting; and increasing the transmission rate of the master device to match a lowest of the transmission rates of the plurality of token devices; wherein receiving the data at the master device from the plurality of token devices includes receiving a speed sequence transmission from each of the plurality of token devices, the speed sequence transmission including a number of cycles, and wherein using the received data to determine the rate at which each of the plurality of token devices are transmitting includes dividing the number of cycles by a time taken to receive the number of cycles.

19. A system comprising: a master device that transmits initial data at an initial transmission rate, the initial transmission rate comprising a lowest possible rate at which a potential token device may receive initial data; and one or more token devices that receive the transmitted data from the master device and send speed sequence data to the master device, wherein the master device uses the speed sequence data to determine a rate at which the one or more token devices are transmitting, and increases the transmission rate of the master device to a lowest transmission rate of the one or more token devices; wherein the speed sequence data includes a number of cycles, and wherein the master device determines the rate at which the one or more token devices are transmitting by dividing the number of cycles by a time taken to receive the number of cycles.

20. A system comprising: means for transmitting initial data from a master device to one or more token devices at an initial transmission rate based on a lowest possible rate at which the one or more token devices may receive initial data; means at the master device for receiving data from the one or more token devices and for determining a rate at which the one or more token devices are transmitting based on the data received from the one or more token devices; and means for increasing the transmission rate of the master device to a lowest transmission rate of the one or more token devices; wherein the data received from the one or more token devices includes a speed sequence transmission, the speed sequence transmission including a number of cycles, and wherein means for determining the rate at which the one or more token devices are transmitting divides the number of cycles by a time taken to receive the number of cycles.

* * * * *

UNITED STATES PATENT AND TRADEMARK OFFICE
CERTIFICATE OF CORRECTION

| | | |
|---|---|---|
| PATENT NO. | : 7,830,799 B2 | Page 1 of 1 |
| APPLICATION NO. | : 10/949000 | |
| DATED | : November 9, 2010 | |
| INVENTOR(S) | : Shane Shivji | |

It is certified that error appears in the above-identified patent and that said Letters Patent is hereby corrected as shown below:

In column 9, line 25, in Claim 2, delete "initialing" and insert -- initiating --, therefor.

In column 9, line 30, in Claim 2, delete "for" and insert -- from --, therefor.

In column 10, line 30, in Claim 18, delete "at potential" and insert -- a potential --, therefor.

Signed and Sealed this
Nineteenth Day of April, 2011

David J. Kappos
*Director of the United States Patent and Trademark Office*